(12) United States Patent
Devaraj et al.

(10) Patent No.: US 11,805,103 B2
(45) Date of Patent: Oct. 31, 2023

(54) DYNAMIC SELECTION OF TUNNEL ENDPOINTS

(71) Applicant: Hewlett Packard Enterprise Development LP, Houston, TX (US)

(72) Inventors: Sasindran Devaraj, Bangalore (IN); Vijayakumar Subramanian, Bangalore (IN); Vinodh Kumar Velur Sukumarran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 8 days.

(21) Appl. No.: 17/235,034

(22) Filed: Apr. 20, 2021

(65) Prior Publication Data

US 2022/0182359 A1    Jun. 9, 2022

(51) Int. Cl.
*H04L 29/06* (2006.01)
*H04L 9/40* (2022.01)

(52) U.S. Cl.
CPC ........ *H04L 63/029* (2013.01); *H04L 63/0236* (2013.01); *H04L 63/0876* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,779,051 B1 | 8/2004 | Basil et al. | |
| 7,653,074 B2 | 1/2010 | Asayesh et al. | |
| 8,046,829 B2 * | 10/2011 | Oba | H04L 63/08 726/14 |
| 8,261,339 B2 * | 9/2012 | Aldridge | H04L 63/0272 726/3 |
| 2006/0002356 A1 * | 1/2006 | Barany | H04W 8/06 455/433 |
| 2018/0241586 A1 * | 8/2018 | Li | H04L 45/036 |
| 2020/0045604 A1 * | 2/2020 | Allan | H04W 36/165 |
| 2021/0399947 A1 * | 12/2021 | Devaraj | H04L 12/1886 |
| 2022/0029989 A1 * | 1/2022 | Mathur | G06F 21/606 |

OTHER PUBLICATIONS

MS Switch Access Policies (802.1X), (Web Page), Retrieved Oct. 23, 2020, 6 Pgs.

* cited by examiner

*Primary Examiner* — Sanchit K Sarker
(74) *Attorney, Agent, or Firm* — Hewlett Packard Enterprise Patent Department

(57) ABSTRACT

Examples of dynamically selecting tunnel endpoints are described. In an example, a request for authenticating a client device connected to an edge device via a wired link is received. The request includes information indicative of a port of the edge device at which the client device is connected and a type of the client device. Based on at least one of the port, the type, resource availability of a plurality of network devices, and location of the plurality of network devices, a network device is identified as a tunnel endpoint. A message indicative of a successful authentication of the client device is sent to the edge device. The message includes a network address of the network device identified as the tunnel endpoint.

20 Claims, 5 Drawing Sheets

DYNAMIC SELECTION OF TUNNEL ENDPOINTS

BACKGROUND

A computer network includes a variety of networking devices, such as access points, controllers, gateways, switches, etc., which perform different network operations, such as network access, authentication, and routing network traffic to provide connectivity. An edge device provides an entry point into enterprise or service provider core networks. Examples of edge devices include routers, routing switches, integrated access devices, multiplexers, and a variety of metropolitan area network and wide area network access devices. Client devices accessing the network may be connected to edge devices.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
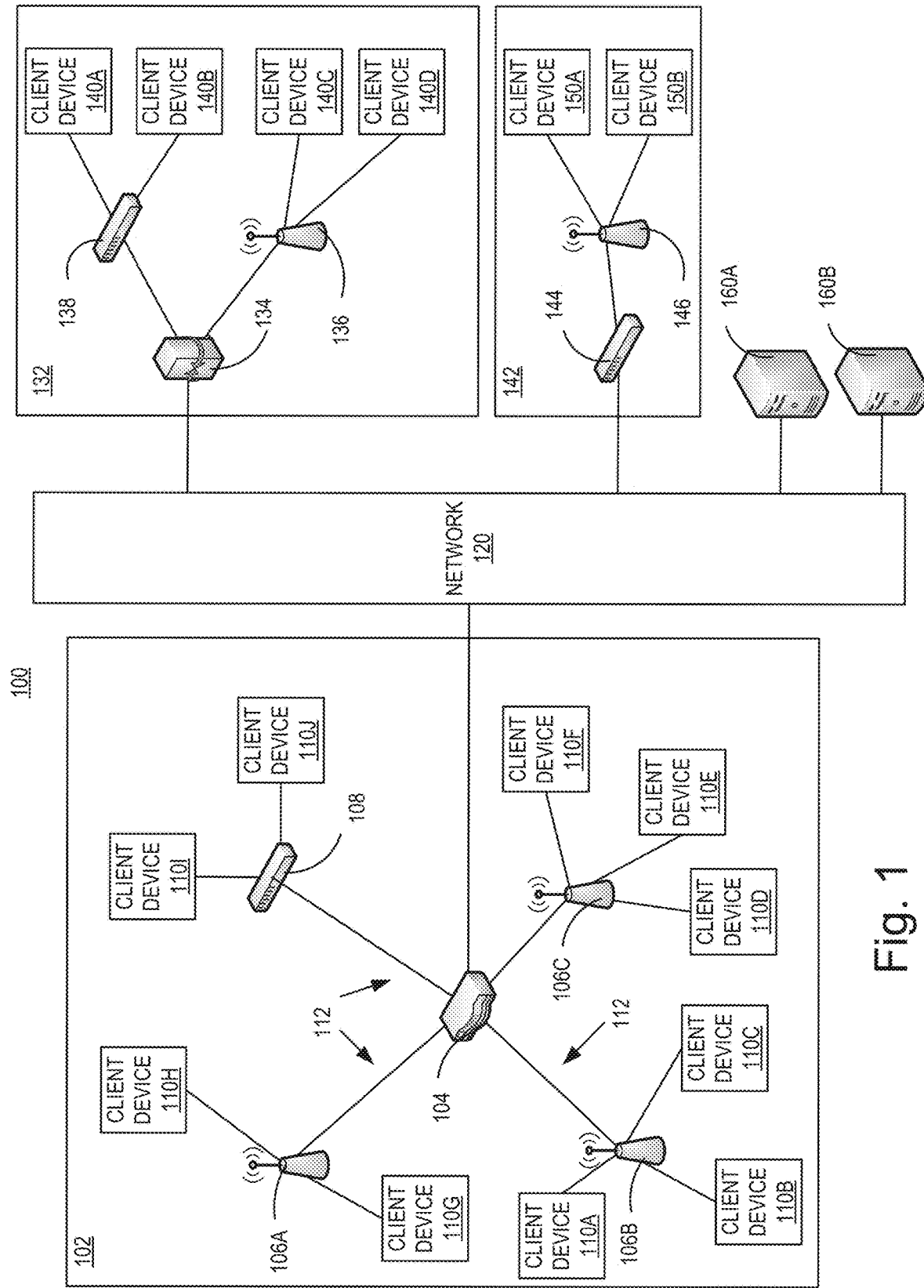
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Multiple client devices, such as computers, cameras, printers, payment card readers, etc., may be connected to an edge device, such as a switch, which may act as a gateway to a network. Each of the client devices may be connected to the edge device via respective ethernet ports of the edge device. The edge device generally connects to a network device, such as a controller, to route the data from multiple client devices to designated servers.

When a client device is connected to an edge device, the client device generally authenticates itself based on message exchange with an authentication server. After a successful authentication, network traffic from the client device may be forwarded to the network device, via the edge device, for further inspection and policy enforcement.

Generally, the edge device is configured to connect to a single predefined network device, such as, a particular controller. Thus, traffic from multiple client devices connected to the edge device is forwarded through the single predefined network device. In other words, the predefined network device acts as a tunnel endpoint for the traffic flows from multiple client devices connected to the edge device. From the predefined network device, the traffic flows of the client devices may be routed or switched to their destination servers. Since, the traffic flows from multiple client devices are tunneled into the single predefined controller, there may be an increased processing load at the controller. Also, any failure in the controller may adversely affect connectivity between the multiple client devices and their corresponding destination servers. Further, in some scenarios, routing traffic flows from multiple client devices through the predefined controller may result in increased hops for the traffic flow to reach its destination server, thereby resulting in transmission delays and increased chances of packet drops at multiple hops.

The present disclosure relates to techniques of dynamically selecting a tunnel endpoint for a client device connected to the edge device. The present disclosure enables separate tunnel endpoints to be selected for different client devices connected to an edge device. In an example, each client device connected to the edge device may be tunneled to a corresponding controller based on client type, port information, resource availability, and location of the network devices. Thus, tunneling all the client devices connected to the edge device to a single predefined network device may be prevented, thereby reducing processing load and chances of failure at the predefined network device. In the present disclosure, a tunnel endpoint may be dynamically identified for each type of client device. Also, the network device nearest to the destination server of a client device may be selected as the tunnel endpoint thereby reducing the number of hops for traffic flow from the client device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for client devices 110*a-h*. The APs 106*a-c* may control network access of the client devices 110*a-h* and may authenticate the client devices 110*a-h* for connecting to the APs and through the APs, to other devices within the network configuration 100. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Figure 2:
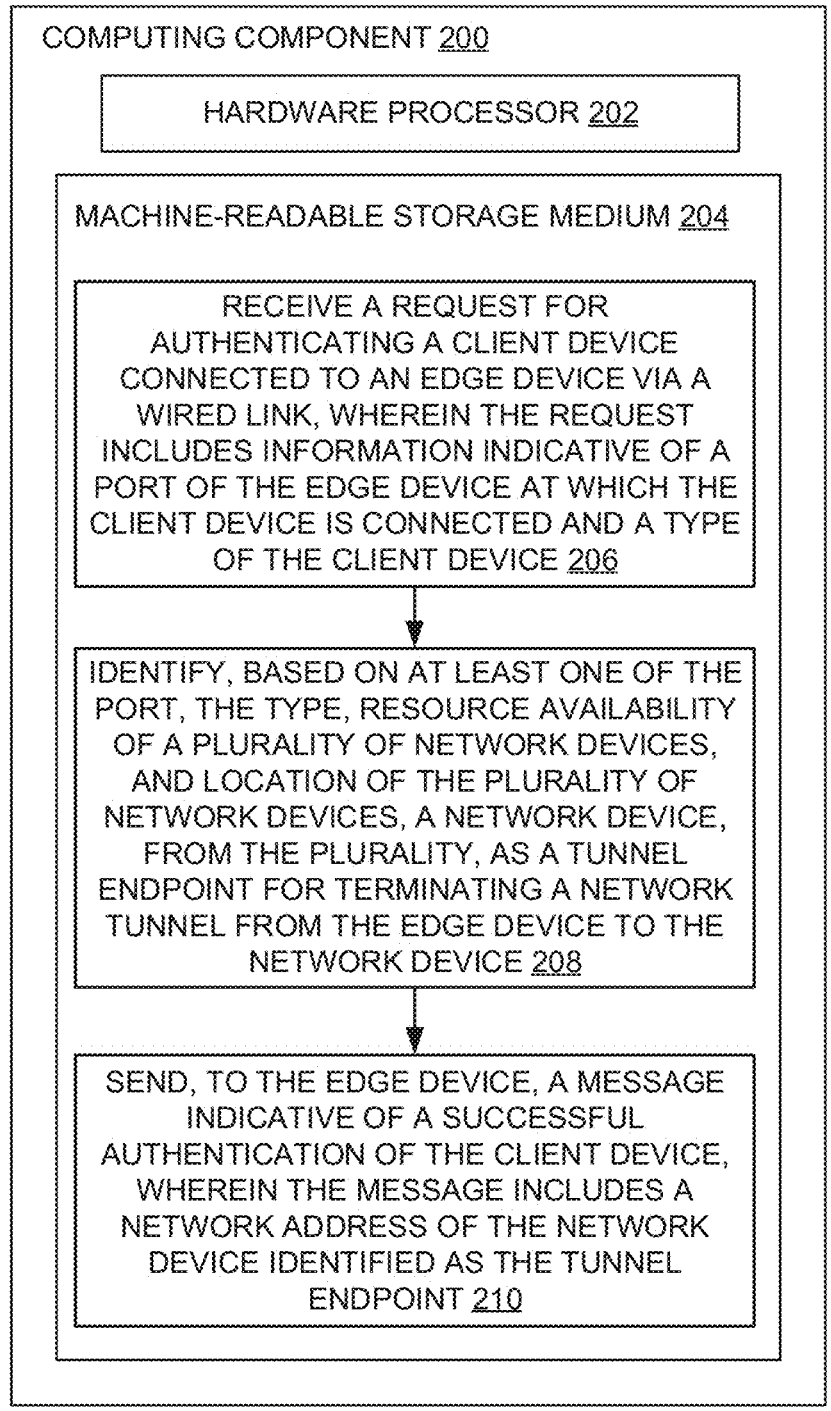
FIG. 2 is a block diagram of an example computing component or device for selection of tunnel endpoints in accordance with an embodiment.

FIG. 2 is a block diagram of an example computing component or device 200 for selecting a tunnel endpoint in a network. In an example, the computing component 200 may be a remote server functioning as a network manager, as referred to in embodiments described herein. Computing component 200 may be, for example, a cloud-based network management platform. In an example, the computing component 200 is configured to deploy, manage, and optimize WLAN, wired LANs, Virtual Private Networks (VPNs), and Software Defined Networking in Wide Area Networks (SD-WANs).

In the example implementation of FIG. 2, the computing component 200 includes a hardware processor, 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-210, to control processes or operations for selecting a tunnel endpoint in a network. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-210.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 3, at a differing level of detail.

In step 206, a request for authenticating a client device connected to an edge device via a wired link is received by the network manager. In response to the client device being connected to the edge device, the client device may send the request to the network manager. The network manager may include a Remote Authentication Dial-In User Service (RADIUS) authentication server. The request may be a RADIUS Access Request message requesting authorization to access an enterprise network. In an example, the client device may be a wired client device, such as client devices 110i-110j connected to an edge device, such as the switch 108 via wired links, such as connections 112 of FIG. 1. The client device may be connected to a port of the edge device. The port may be a physical interface in the edge device for connecting electronic devices. A type of the client device may be indicative of the traffic flow between the client device and a server. In an example, the type of the client device may be an Internet of Things (IoT) device, a printing device, a Voice over Internet Protocol (VoIP) phone, etc. In an example, the type of the client device may be identified from a user agent string information included in the request. The user agent string information may include information about a system application, operating system, vendor, and/or version of the requesting client device. In another example, the type of the client device may be identified from a DHCP request sent by the client device to the network manager. The DHCP request may include information about the type of the client device. Thus, information indicative of the type of the client device may be included in the request for authentication. The request also includes information indicative of the port of the edge device at which the client device is connected. In an example, the request may include a port number of the edge device at which the client device is connected.

In step 208, the network manager may identify a network device from a plurality of network devices as a tunnel endpoint for terminating a network tunnel from the edge device to the network device. In an example, the network device may be a controller which is responsible for policy enforcement in the network traffic. The network tunnel may constitute a virtual path connecting two tunnel endpoints, viz., the edge device and the network device. Encapsulated data packets may be transported through the network tunnel, between the edge device and the network device. The data packets transported through the network tunnel may be encapsulated using a tunneling protocol, such as Generic Routing Encapsulation (GRE). The network device may be identified as the tunnel endpoint based on at least one of the port at which the client device is connected, the type of the client device, resource availability of the plurality of network devices, and location of the plurality of network devices.

In step 210, the network manager may send a message to the edge device, where the message is indicative of a successful authentication of the client device. The message includes a network address of the network device identified as the tunnel endpoint. Thus, once a network device from the plurality is identified as the tunnel endpoint, a network address, such as an IP address of the network device is sent to the edge device. In this manner, the network device is designated to act as the tunnel endpoint for a specific client device.

Figure 3A:
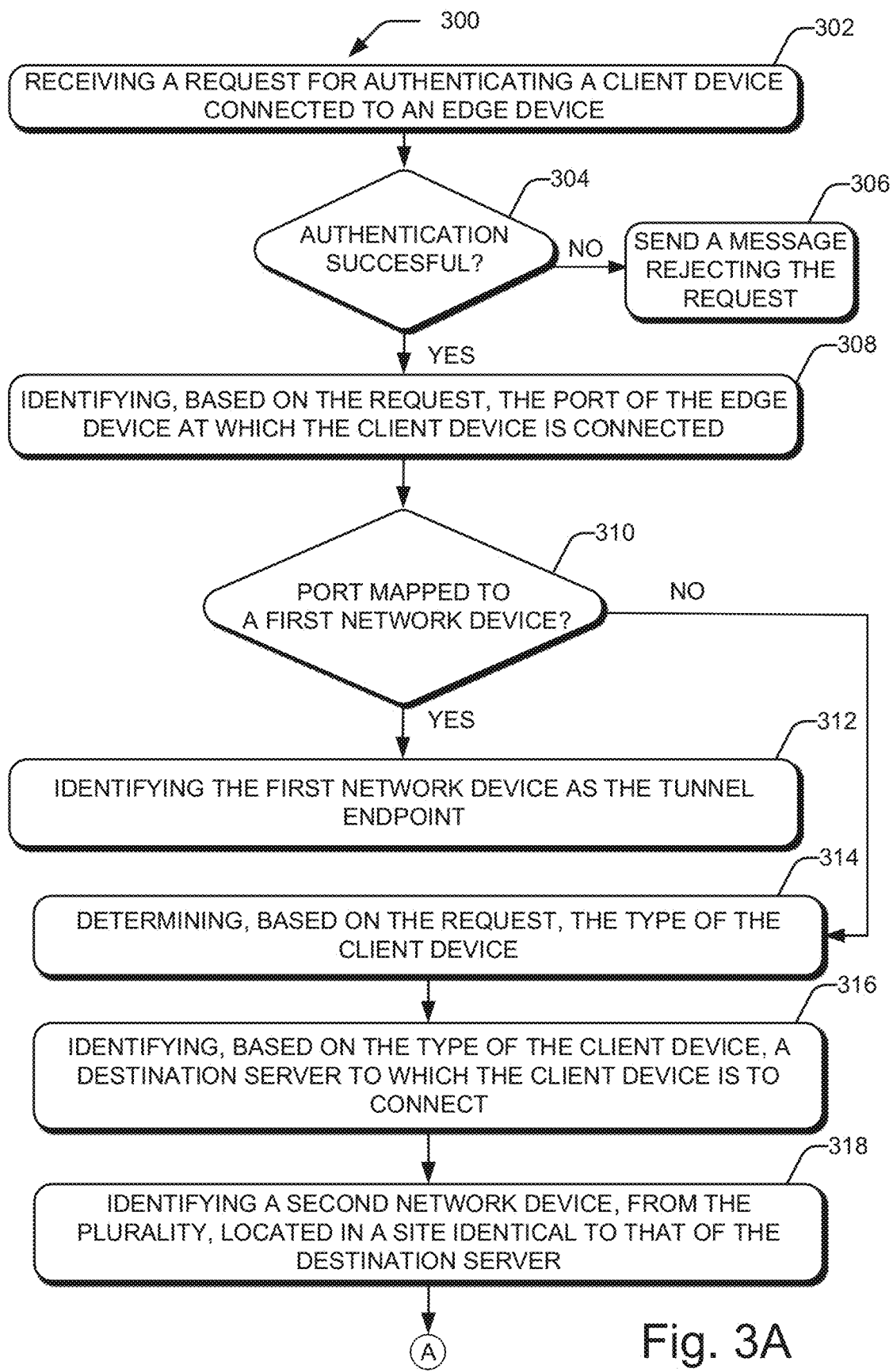
FIGS. 3A and 3B illustrate an example method for selection of tunnel endpoints in accordance with an embodiment.
Figure 3B:
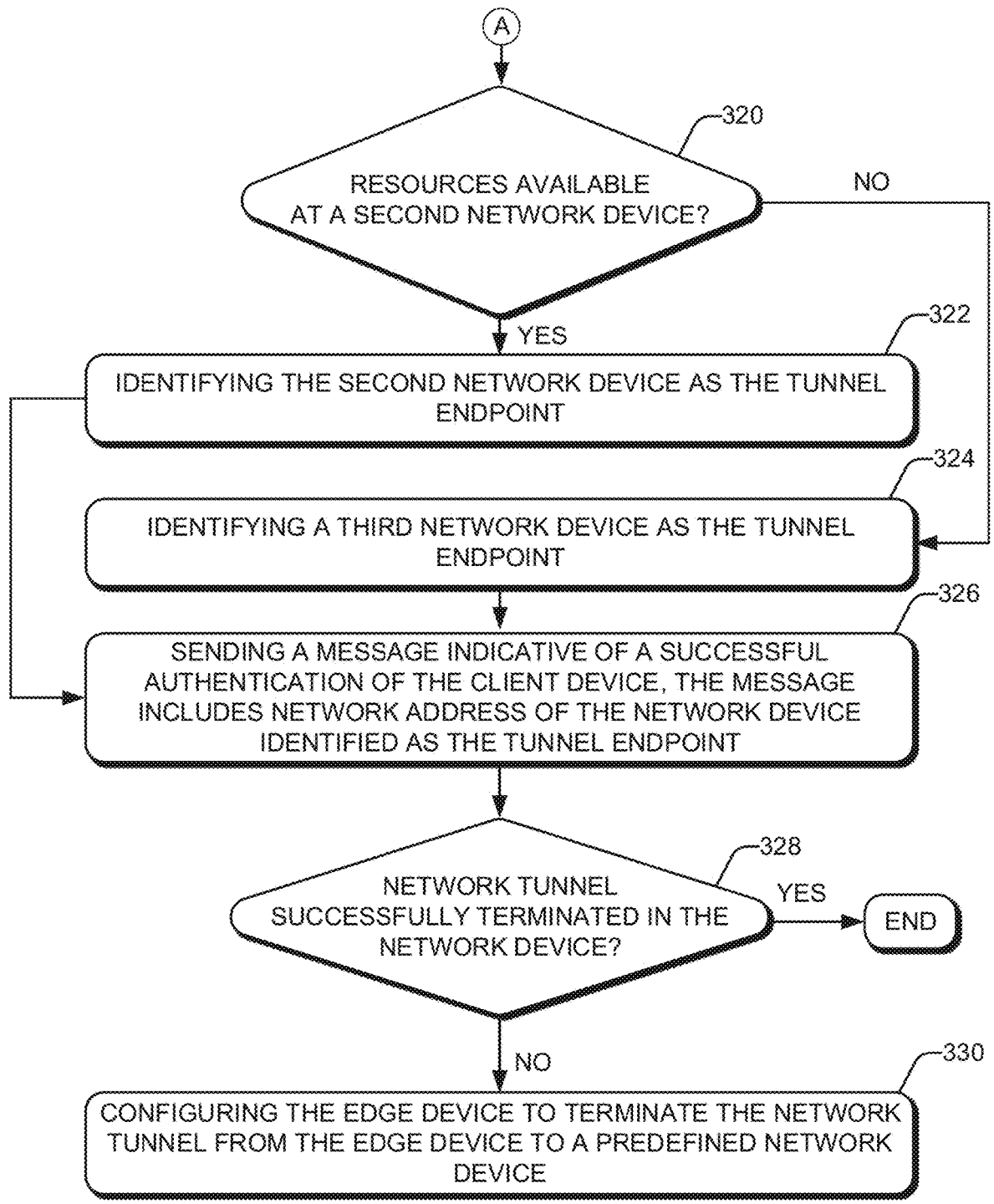

Further details of selecting a tunnel endpoint in a network are described referring to FIGS. 3A and 3B. FIGS. 3A and 3B illustrate an example method 300 for selecting a tunnel endpoint in accordance with an embodiment. The method 300 may be executed by a network manager. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource of a network manager. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

At block 302, a client device, such as a client device 110i or 110j of FIG. 1, connected to an edge device, such as switch 108 of FIG. 1, via a wired link may send a request for authentication to a network manager. In an example, the client devices 110i and 110j may generate the request for authentication based on an input from a network administrator and then the client devices may send the request to the network manager via a controller, such as the controller 104 of FIG. 1. In an example, the network manager may be implemented in a cloud server. The request may include information indicative of a port of the edge device at which the client device is connected, such as a port number of the edge device. Information indicative of the type of the client device may be included in the request. The type of the client device may be one of a web access client, an IoT client, etc. The type of the client device may be indicative of traffic flow between the client and a server.

At block 304, it is checked whether the authentication is successful. In an example, the network manager may authenticate the client device based on credentials, such as a username and password, or a security certificate. If the authentication is not successful ("No" branch from block 304), a message rejecting the request for authentication is sent to the client device, at block 306. If the authentication is successful ("Yes" branch from block 304), at block 308, the network manager may identify, based on the request for authentication, the port of the edge device at which the client device is connected. In an example, the network manager may extract the port number included in the request. At block 310, it is checked, based on a predefined mapping, whether the port is mapped to a first network device from a plurality of network devices. In an example, the plurality of network device may include controllers, such as the controller 104 as shown in FIG. 1. The network, such as the network 120 of FIG. 1 may include the plurality of controllers. In an example, the predefined mapping may include information associating specific ports of the edge device with specific controllers. For example, a specific port of the edge device may be mapped to a specific controller which is selected as a tunnel endpoint for client devices connected to the specific port. Thus, using the predefined mapping a network device may be assigned for a port, where the network device is selected as the tunnel endpoint for client devices connected to that port. The predefined mapping may be stored in the network manager. In response to determining that the port is mapped to the first network device ("Yes" branch from block 310), the network manager identifies the first network device as the tunnel endpoint, at block 312. In an example, the tunnel endpoint is a node at the end of a GRE tunnel originating from the edge device.

In response to determining that the port is not mapped to a network device ("No" branch from block 310), the type of the client device is determined based on the request for authentication received by the network manager from the client device, at block 314. The request may include a descriptor of the type of the client device. In an example, the type of the client device may be identified as Web access. Such a client device of web access type primarily exchanges data with a web server. Thus, a destination server of a client device of web access type may be identified as a web server. Likewise, the type of client device may be an IoT device, say, a camera. Such a client device of IoT device type primarily exchanges data with an IoT server. Thus, the IoT server may be identified as the destination server of a client device of IoT type. In this manner, at block 316, based on the type of the client device, a destination server is identified to which the client device is to connect. The destination server corresponding to the type of the client device may be predefined in the network manager.

At block 318, from the plurality of network devices in the network, a second network device is identified, such that the second network device is located in a site identical to that of the destination server. In an example, the network manager has visibility of the network infrastructure. Thus, in an example, the network manager may identify a controller and the destination server co-located in the same physical/geographical site.

At block 320, resource availability of the second network device is determined. In an example, the network manager may check resource consumption, such as processor consumption, memory consumption, and a number of client devices connected to the second network device. Based on the resource consumption, the resource availability of the second network device is determined.

At block 322, in response to determining that the second network device is available to accept a connection from the client device ("Yes" branch from block 320), the second network device may be identified as the tunnel endpoint. At block 324, in response to determining that the second network device is unavailable to accept a connection from the client device ("No" branch from block 320), a third network device may be identified as the tunnel endpoint. In an example, the second network device may be serving a maximum number of clients that can be simultaneously served by the second network device. Thus, the second network device may be unavailable to accept the connection from the client device. In another example, processing resource or memory resource of the second network device may be exhausted and the second network device may be unavailable to serve the client device. In an example, prior to identifying the third network device as the tunnel endpoint, resource availability of the third network device may also be checked. In response to determining that the third network device is available to accept a connection from the client device, the third network device may be identified as the tunnel endpoint.

In an example, the third network device may be a controller in the same site as that of the destination server and the distance between the third network device and the destination server may be greater than the distance between the second network device and the destination server. In an example, the distance is in terms of a hop count between the network devices and the destination server. The hop count refers to the number of intermediate network devices, such as switches, routers, or controllers, through which data passes to reach the destination server. In another example, the third network device is located in a site closest to the site of the destination server.

In response to one of the first, second, and third network device being identified as the network tunnel, a message indicative of a successful authentication of the client device is sent to the edge device, at block 326. The message includes a network address of the network device identified as the tunnel endpoint. In an example, the message is a RADIUS-accept message confirming authentication of the client device. The RADIUS-accept message may include a vendor specific attribute (VSA) indicative of the network address of the network device identified as the tunnel endpoint. The network address may include an IP address and a Transmission Control Protocol (TCP)/User Datagram Protocol (UDP) port number of the controller identified as the tunnel endpoint. Thus, information of the tunnel endpoint for the client device is shared with the edge device. In an example, based on the network address, the edge device may establish a GRE tunnel, from the edge device to the network device identified as the tunnel endpoint.

In an example, the message indicative of successful authentication includes information of a role of the client device. The role is indicative of permissions of the client device to access applications and services hosted by the network device. In an example, the role may be determined based on the type of the client device. In an example, the message indicative of successful authentication is a RADIUS-accept message which may include a VSA indicative of the role of the client device.

At block 328, it is checked whether the network tunnel is successfully terminated in the network device identified as the tunnel endpoint. Terminating the network tunnel in the network device includes establishing a GRE tunnel between the edge device and the network device. In an example, a failure may be encountered in terminating the network tunnel in the network device and the network device may be unreachable. In an example, the link between the network device identified as the tunnel endpoint and the edge device may encounter a failure or the network device may be subject to a fault, thereby refusing to accept a connection from the edge device. Thus, if the network tunnel is not successfully terminated in the network device ("No" branch from block 328) identified as the network tunnel, the edge device is configured to terminate the network tunnel from the edge device to a predefined network device at block 330. Network address of the predefined network device may be stored in the network manager.

Figure 4:
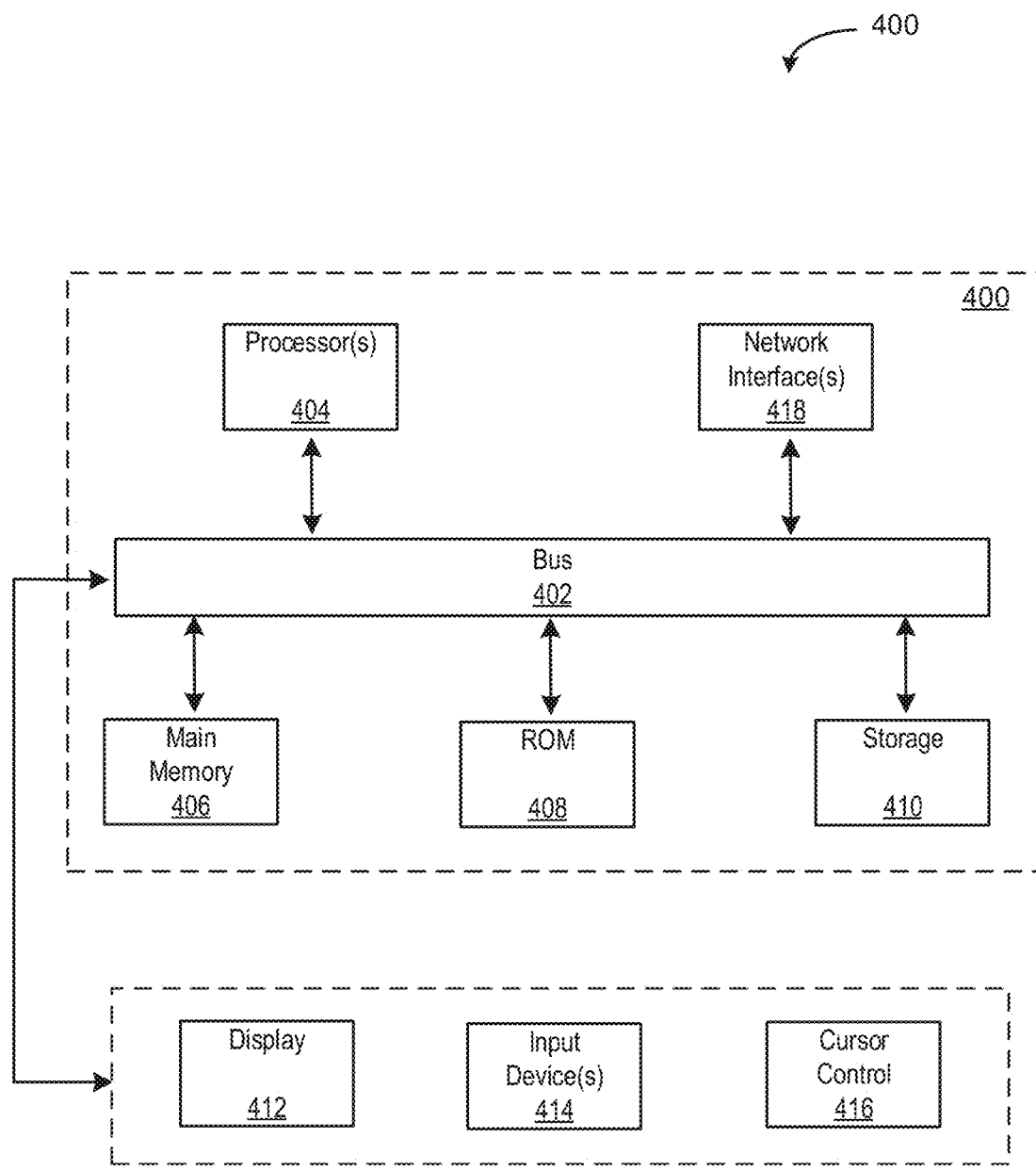
FIG. 4 depicts a block diagram of an example computer system in which the embodiments described herein may be implemented.

FIG. 4 depicts a block diagram of an example computer system 400 in which the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Per, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418. The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for selecting a tunnel endpoint in a network, comprising:
   receiving, by a network manager, a request for authenticating generated by a client device connected to an edge device via a link, wherein the request includes information indicative of a type of the client device, and wherein the network manager comprises a remote server comprising authentication capabilities;
   identifying, by the network manager, based on the type of the client device, resource availability of a plurality of network devices, and location of the plurality of network devices, a network device, from the plurality of network devices, as a tunnel endpoint for terminating a network tunnel from the edge device to the network device by:
  determining, based on the request, the type of the client device;
  identifying, based on the type of the client device, a destination server to which the client device is to connect;
  identifying a first network device, from the plurality of network devices, located in a site identical to that of the destination server;
  determining resource availability of a first network device based on processor consumption, memory consumption, and a number of client devices connected to the first network device; and
  in response to determining that the first network device is available to accept a connection from the client device based on the resource availability of the first network device, identifying the first network device as the tunnel endpoint; and
  sending, by the network manager to the edge device, a message indicative of a successful authentication of the client device responsive to the request for authenticating, wherein the message includes a network address of the first network device identified as the tunnel endpoint.

2. The method of claim 1, further comprising, determining, by the network manager, a role for the client device, wherein the role is indicative of permissions of the client device to access applications and services hosted by the network device.

3. The method of claim 2, wherein the message includes a vendor specific attribute (VSA) indicative of the role of the client device.

4. The method of claim 1, wherein identifying the network device as the tunnel endpoint further comprises:
  identifying, based on the request, a port of the edge device at which the client device is connected, wherein the request further includes information indicative of the port of the edge device at which the client device is connected;
  determining, based on a predefined mapping, whether the port is mapped to a second network device from the plurality of network devices; and
  in response to determining that the port is mapped to the second network device, identifying the second network device as the tunnel endpoint.

5. The method of claim 1, wherein identifying the network device as the tunnel endpoint further comprises:
  in response to determining that the first network device is unavailable to accept a connection from the client device, identifying a third network device, from the plurality of network devices, located in a site closest to that of the destination server; and
  in response to determining that the third network device is available to accept a connection from the client device, identifying the third network device as the tunnel endpoint.

6. The method of claim 1, wherein in response to one of a failure being encountered in terminating the network tunnel in the network device and the network device being unreachable, configuring the edge device to terminate the network tunnel from the edge device to a predefined network device.

7. The method of claim 1, wherein the message includes a VSA indicative of the network address of the network device identified as the tunnel endpoint.

8. The method of claim 1, wherein the network tunnel is a Generic Routing Encapsulation (GRE) tunnel.

9. The method of claim 1, wherein the remote server is a Remote Authentication Dial-In User Service (RADIUS) authentication server.

10. The method of claim 1, wherein the network manager includes a cloud-based network manager.

11. A network manager comprising:
  a remote server comprising authentication capabilities, the remote server comprising:
    a processor; and
    a memory coupled to the processor, the memory storing instructions executed by the processor to:
      receive a request for authenticating generated by a client device connected to an edge device via a link, wherein the request includes information indicative of a-a type of the client device;
      identify, based on the type of the client device, resource availability of a plurality of network devices, and location of the plurality of network devices, a network device, from the plurality of network devices, as a tunnel endpoint for terminating a network tunnel from the edge device to the network device by:
        determining, based on the request, the type of the client device;
        identifying, based on the type of the client device, a destination server to which the client device is to connect;
        identifying a first network device, from the plurality of network devices, located in a site identical to that of the destination server;
        determining resource availability of the first network device based on processor consumption, memory consumption, and a number of client devices connected to the first network device; and
        in response to determining that the first network device is available to accept a connection from the client device based on the resource availability of the first network device, identifying the first network device as the tunnel endpoint; and
      send, to the edge device, a message indicative of a successful authentication of the client device responsive to the request for authenticating, wherein the message includes a network address of the first network device identified as the tunnel endpoint.

12. The network manager of claim 11, wherein the processor is further to:
  determine a role for the client device, wherein the role is indicative of permissions of the client device to access applications and services hosted by the network device.

13. The network manager of claim 12, wherein the message includes a vendor specific attribute (VSA) indicative of the role of the client device.

14. The network manager of claim 11, wherein identifying the network device as the tunnel endpoint further comprises:
  identifying, based on the request, a port of the edge device at which the client device is connected, wherein the request further includes information indicative of the port of the edge device at which the client device is connected;
  determining, based on a predefined mapping, whether the port is mapped to a second network device from the plurality of network devices; and
  in response to determining that the port is mapped to the second network device, identifying the second network device as the tunnel endpoint.

15. The network manager of claim 11, wherein identifying the network device as the tunnel endpoint further comprises:
- in response to determining that the first network device is unavailable to accept a connection from the client device, identifying a third network device, from the plurality of network devices, located in a site closest to that of the destination server; and
- in response to determining that the third network device is available to accept a connection from the client device, identifying the third network device as the tunnel endpoint.

16. The network manager of claim 11, wherein in response to one of a failure being encountered in terminating the network tunnel in the network device and the network device being unreachable, configuring the edge device to terminate the network tunnel from the edge device to a predefined network device.

17. A non-transitory computer-readable medium comprising computer-readable instructions, the computer-readable instructions when executed by a processor, cause the processor to:
- receive, by a remote server comprising authentication capabilities, a request for authenticating generated by a client device connected to an edge device via a link, wherein the request includes information indicative of a type of the client device;
- identify, based on the type of the client device, resource availability of a plurality of network devices, and location of the plurality of network devices, a network device, from the plurality of network devices, as a tunnel endpoint for terminating a network tunnel from the edge device to the network device by:
- determining, based on the request, the type of the client device;
- identifying, based on the type of the client device, a destination server to which the client device is to connect;
- identifying a first network device, from the plurality of network devices, located in a site identical to that of the destination server;
- determining resource availability of the first network device based on processor consumption, memory consumption, and a number of client devices connected to the first network device; and
- in response to determining that the first network device is available to accept a connection from the client device based on the resource availability of the first network device, identifying the first network device as the tunnel endpoint; and
- send, to the edge device, a message indicative of a successful authentication of the client device responsive to the request for authenticating, wherein the message includes a network address of the first network device identified as the tunnel endpoint.

18. The non-transitory computer-readable medium of claim 17, wherein the instructions further cause the processor to:
- determine a role for the client device, wherein the role is indicative of permissions of the client device to access applications and services hosted by the network device.

19. The non-transitory computer-readable medium of claim 18, wherein the message includes a vendor specific attribute (VSA) indicative of the role of the client device.

20. The non-transitory computer-readable medium of claim 17, wherein identifying the network device as the tunnel endpoint further comprises:
- identifying, based on the request, a port of the edge device at which the client device is connected, wherein the request further includes information indicative of the port of the edge device at which the client device is connected;
- determining, based on a predefined mapping, whether the port is mapped to a second network device from the plurality of network devices; and
- in response to determining that the port is mapped to the second network device, identifying the second network device as the tunnel endpoint.

* * * * *